April 30, 1968
N. S. PATTERSON
3,380,201
POWER-OPERATED TOOLS
Filed Jan. 20, 1966
2 Sheets-Sheet 1
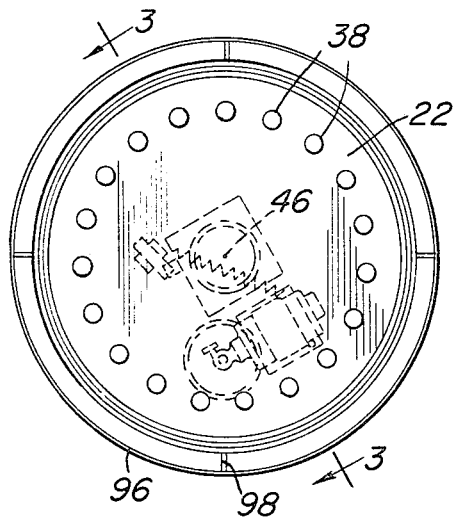
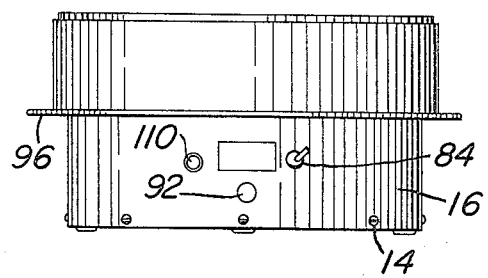
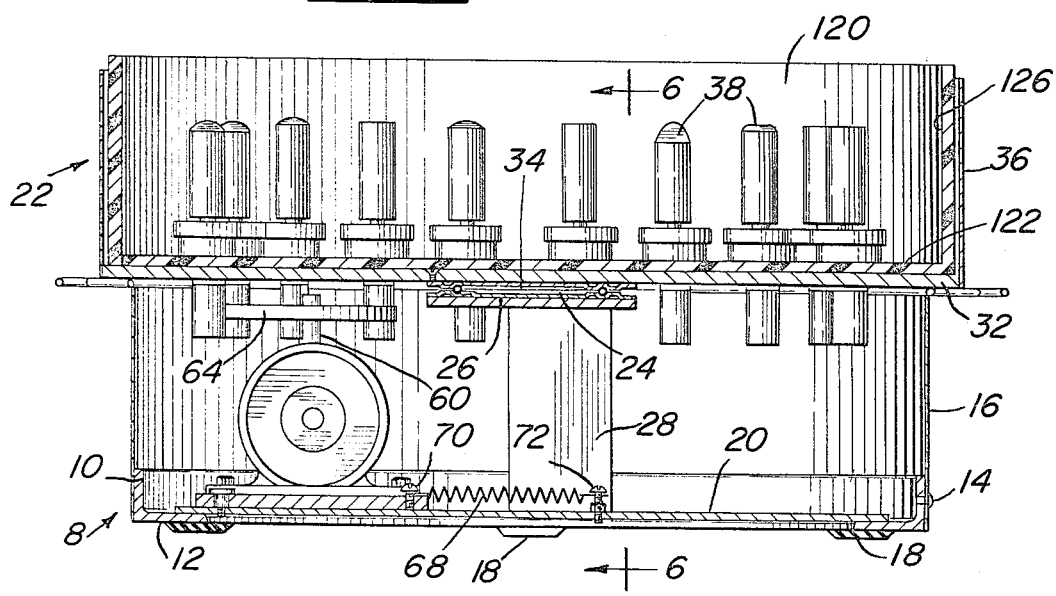
INVENTOR
NORMAN S. PATTERSON
BY Brown, Jackson,
Boettcher & Dienner
ATTY

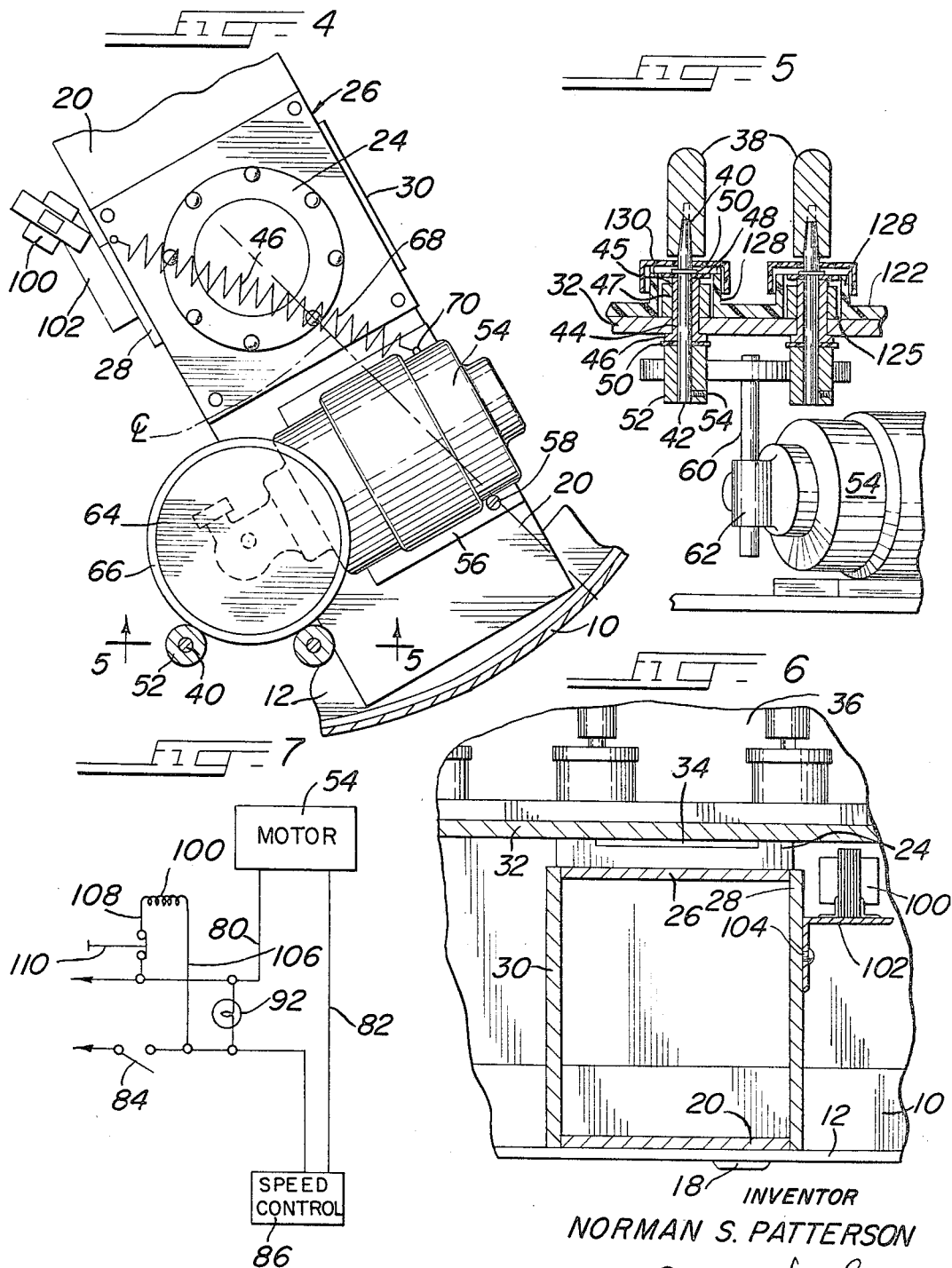

3,380,201
POWER-OPERATED TOOLS
Norman S. Patterson, 17037 S. Oak Park Ave.,
Tinley Park, Ill. 60477
Filed Jan. 20, 1966, Ser. No. 521,785
6 Claims. (Cl. 51—134.5)

This invention relates to power-operated tools and particularly machines having plural tools which may be selectively located for use and rotation by a common power source. Although not limited thereto, the invention has particular application to a contact lens finishing machine.

There are many instances where an individual is required to use a number of power-operated tools to perform a specific task. For example, in the fitting of a contact lens to a patient's eye, the fitter may be required to perform several operations on the contact lens. These may include cutting its scleral portion to a new shape or size, finish grinding and/or beveling and polishing either or both the edge and the adjacent surfaces. To perform all of these operations some nineteen different tools are put at the disposal of the contact lens technician or fitter. These usually include a diamond cone tool for cutting down the scleral portion of the lens, a diamond beveled stone and a polishing tool. In addition, he will be provided with a series of aligned base curve tools for reshaping the lens surface, plus a second series of align tools which may be used for finishing the edge of the contact lens. He may also have need for a flat sponge tool and a cone sponge tool. Each of these tools is conventionally used by rotating it about its axis, but not always at the same speed, and the contact lens or appropriate portion thereof to be ground is held in engagement with the rotating stone or tool to effect a specific finishing operation.

In the past, it has been customary to adapt each of these tools so that it could be removably mounted on a common support driven by a single motor. However, this was not always satisfactory for the reason that when finishing a lens the fitter is often required to only momentarily touch a lens with not one but several of the mentioned different tools and often he has to keep returning to the same tool, with an intermediate treatment by one or more of the other tools. This has meant that it was necessary for the fitter to continuously interrupt the finishing operation to stop the motor and replace tools. This not only slows down the lens finishing operation, but also breeds a willingness to skip an operation or two in order to avoid having to break down and reset up a tool for only a momentary treatment, or exposure of the lens thereto.

Therefore, the principal object of the present inventon is to provide a machine or apparatus which will provide all of the tools set up for operation and adapted for convenient use.

In accordance with the aforesaid object, the invention contemplates the use of a turntable on which all of the tools are mounted, so that each tool, as it is required, can be brought into position in front of the operator at his option, instantly energized and rotated at the required speed. A feature of the invention is that the operator does not have to move from his seated or standing position in front of the machine and at the same time he has no problem in manipulating the lens or using a particular tool thereon.

A further, and important object of the invention is to provide such an apparatus, which is not only efficient and convenient in its operation, but is also economical and practical to manufacture.

Thus, it is a further feature of the invention, that each tool is mounted on one of a plurality of axially rotatable spindles which are spaced about the periphery of a turntable, the turntable being turnable on its central axis to selectively locate any one of the spindle supported tools to a position in front of the operator's position, together with means such that as each spindle-supported tool is positioned, in front of the operator by turning the turntable, it will be automatically brought into driven engagement with a provided motor.

Thus, an important feature of the present invention is that all of the tools required by the fitter are stored in set up condition out of his way but are instantly available for his use by simply rotating the turntable to locate each tool in front of him as it is required.

A further and companion feature of the invention is that a single motor can be utilized to separately drive, at the operator's election, selected ones of a plurality of different tools and in a fashion so as to minimize torque requirements.

Thus in accordance with the invention, the tools supporting spindles are mounted on the turntable so as to have portions which protrude below the turntable and the spindles also so spaced that as the turntable is rotated, the pair of spindles selectively located in front of the operator have their said protruding portion engaged by the horizontally disposed drive wheel of an electric motor pivotally mounted beneath the turntable, resilient means in the form of a tensioned spring being relied upon for maintaining the drive wheel in engagement with said selected two spindles.

A further feature of the invention is that means are also provided in the form of a normally energized electro magnet which is located so as to hold the turntable against rotation and any tendency to creep with the rotation of the tool supporting spindles engaged by the drive wheel of the motor.

Still another feature of the present invention is the provision of the turntable with a novel construction of liner and the spindles with a deflector which facilitates efficient operation of the apparatus and at the same time accommodates a clog-free operation as well as simplifying cleaning of the turntable.

Still another object of the invention is to provide such a machine or device which is also rugged in its construction, as well as comprised of a minimum number of parts, and economical to manufacture as well as efficient in its operation.

Many other objects, advantages, as well as features of the invention will be at once apparent, or will become so from the more detailed description of a preferred embodiment of the invention which will now be described with reference to the accompanying drawings.

In said drawings:

FIGURE 1 is a top plan view of a contact lens finishing machine, constructed in accordance with the present invention;

FIGURE 2 is a side elevational view thereof;

FIGURE 3 is a vertical sectional view taken therrethrough along lines 3—3 as indicated by the arrows in FIGURE 1;

FIGURE 4 is a fragmented view illustrating details in the construction of the motor mount and supporting structure therefore;

FIGURE 5 is a fragmented view taken along lines 5—5 of FIGURE 4 and looking in the direction indicated by the arrows;

FIGURE 6 is a fragmented vertical sectional view taken along lines 6—6 of FIGURE 3 looking in the direction indicated by the arrows and shows the location of the electromagnetic positioning means which inhibits creep of the turntable during rotation of the elected tool supported spindles; and FIGURE 7 is a diagrammatic view illustrating a wiring plan.

Referring therefore more specifically to the several views wherein like parts are identified by like reference numerals, the invention is shown embodied in a contact lens finishing machine which, as illustrated in FIGURES 1, 2 and 3, comprises an annular base 8 of L-shaped cross section having an upstanding or vertically disposed continuous flange 10, and a horizontally disposed continuous flange 12. Removably secured to the vertical flange 10 as by screws 14 is an encircling sidewall 16 which may be of any suitably finished metal, such as stainless steel. Spaced at appropriate locations about the underside of horizontal flange 12 are pads or feet 18 which may be of rubber or other suitable plastic material and serve as means by which the machine may be stably set on a counter or other appropriate working surface. If it is more convenient or is desired to do so, the machine may also be located in a well or other depressed area. In this event, sidewall 16 may or may not be required. At 20 the base is provided with a diametrically extending crossplate which straddles the opening defined by the annular base 8 and has its opposite ends resting on and welded to the horizontal flange portion 16 thereof. Crossplate 20 constitutes the main support on which the operating structure comprising the machine is mounted, as will now be described.

At 22 is a turntable which is removably mounted on the base by a Lazy Susan type bearing 24. Bearing 24 is of conventional construction and permits the turntable to be rotated through a full 360° in either direction. As illustrated, it is fixedly mounted on a plate 26 which is supported at an appropriate height over crossplate 20 and with its upper surface parallel thereto, as by means of vertical members 28 and 30 which have their upper end portions welded to opposite side edges of said horizontal plate 26 and have their lower end portions welded to opposite side edges of cross member 20.

As shown by FIGURES 1 and 3, turntable 22 includes a circular shaped bottom wall 32 provided with a centrally disposed projection 34 which removably and rotatably seats within the mentioned Lazy Susan bearing 24 and has a surrounding upstanding sidewall 36 welded to the outer peripheral edge thereof. Said bottom and side walls 32, 36 of the turntable may be of chromed steel or other suitable metallic material.

Referring now to FIGURES 1, 3 and 5, at 38 are represented a plurality of tools which may be of any required shape and function to suit the intended purpose of the machine. For example in the illustrated embodiment they are intended for use in finishing contact lenses. As best shown in FIGURE 5, each said tools 38 is removably mounted on the conical shaped upper end 40 of a sinpdle 42 which is mounted to freely rotate on its axis within a bearing 44 non-rotatably secured to the turntable. The number of spindles 42 preferably corresponds to the number of required tools so that one spindle is available for each tool and there is no need to stop operation of the machine to set up or take down tools. In the embodiment illustrated by FIGURE 1, nineteen spindles 42 are shown equidistantly spaced apart and located adjacent the outer periphery of the turntable bottom wall 32, defining a circle whose axis or center corresponds to center 46 of the bearing 24 on which turntable 22 is adapted to be turned. As shown in FIGURE 5, each said spindles 42 is rotatably mounted with the vertically extending bore of a bronze bearing 44 having a stem portion 45 and a lower flanged portion 46. Stem portions 45 of said bearings are preferably press-fitted within provided openings in the turntable bottom wall 32 and over said stems 45 retaining collars 47 are subsequently press fitted. Retaining collars 47 thus cooperate with flanged portions 46 to non-rotatably secure the bearings in place. At 48 each spindle is provided with a lock ring set in a provided groove, and the lower end of each said spindles 42 which protrudes through its bearing 44 is provided with a retainer sleeve 52 of aluminum material which is non-rotatably secured thereto as by a set screw. Between retainer sleeve 52 and bearing flange 46 and also between lock ring 48 and retainer collar 47 and nylon washers 50. Retainer sleeves 52 thus cooperate with lock rings 48 to resist axial movement of the tool supporting spindles 42 in their respective bearings 44. Retainer sleeves 52 also serve to transfer rotating movement to the spindles 42 and their supported tools 38 as will now be described.

Considering now FIGURE 4 in conjunction with FIGURES 3 and 5, beneath the turntable 22 is an electrically energizable motor 54 mounted on a supporting plate 56 to which it is securely fastened and which plate 56 is slidably mounted on cross plate 20 and to one side of the Lazy Susan bearing support represented by plate 24 and supporting members 26 and 28, motor support plate 56 being secured to said cross plate as by pivot pin 58 and the undersides of motor mount plate 56 and the upper surface of cross member 20 having been machined to provide smooth parallel contacting surfaces which effect free relative sliding movement of the motor about said pivot pin 58 through a plane disposed generally normal to axis 46 about which the turntable 22 also turns. At 60 is a vertically disposed shaft which is rotatably mounted in housing 62 at one end of motor 54 and is driven by rotation of the motor shaft to which it is operatively connected as by a worm gear arrangement (not shown). The upper end of shaft 60 supports a rubber-tired bronze drive wheel 64, having such a diameter that its periphery 66 engages the adjacent two of the sleeve-enclosed spindle shafts 42, as for example shown in FIGURE 4. At 68 is a coil spring connected at one end to motor mount plate 56 as by a pin 70 and having its opposite end pinned as by means 72 to member 28 such that the force exerted by spring 68 intersects a plane CL which includes the center of rotation 46 of the turntable and pivot 58 about which the motor swings. By reason thereof spring 68 constantly exerts a force on the motor which is fulcrumed at 58 releaseably retaining drive wheel 64 in driving engagement with sleeves 52 of the two spindle shafts 42 positioned adjacent thereto, as illustrated by FIGURE 4. At the same time, spring 68 constitutes a yielding force which allows the turntable 22 to be turned in order to selectively locate a different adjacent two spindles 42, 42 and their supported tools 38, 38 in driven engagement with drive wheel 64. It also performs an indexing function in centering the drive wheel 64 between the elected pair of spindles.

As shown at FIGURE 7, one side of motor 54 is connected by line 80 to an appropriate AC or DC electrical power source and its other side is connectable thereto by line 82. Series connected in line 82 is a main switch 84 shown mounted on the side wall 16 of base 8 (FIGURE 2) for convenient access by the operator. At 86 is a speed control device also series connected in line 82. Speed control device 86 may be a rheostat of conventional construction and is preferably foot-operated, and for this purpose line 82 may be made long enough and appropriately insulation sheathed to permit locating device 86 on the floor beneath the counter on which the machine is used. If desired, the speed control device may also be adapted for manual operation, and, in this event, it would be mounted on base 12 in a conveniently accessible location, as for example through wall 16. Connected across lines 80, 82 in parallel with motor 84 is a lamp 92 which is energized on closing of the main switch 84 and indicated the main switch turn on. Speed control device 86 is preferably of the type which includes an "off" position as well as an adjustable rheostat permitting regulation of the speed of rotation of motor 54 and thereby speed of rotation of the tools 48 mounted on the pair of spindles 38 whose sleeves 52 are drivingly engaged by drive wheel 64 under the resilient tensioning of spring 68.

It will thus be appreciated that turntable 22 may be rotated to locate any adjacent two of the supporting spindles 42 to a position in front of the operator and where they are drivingly engaged by drive wheel 64. The tools when so positioned also can be rotated at a speed determined by the setting of the speed control device 86. Preferably turntable 22 is also provided with a peripherally located ring type handle 96 which is secured in spaced relation to the peripheral wall 36 of the turntable as by radially disposed spokes 98.

In order to inhibit any tendency the turntable might have to creep, in response to rotation of the spindles 42 in their bearings 44, means are provided in the form of an electro-magnetic brake or positioning device indicated generally at 100 in FIGURES 4 and 6. As shown in said figures, electro-magnet 100 is supported on a bracket 102 bolted or otherwise fastened to supporting member 28 and is located at a height sufficiently close to the metallic bottom wall 32 of the turntable and also sufficiently remote from the center of rotation thereof and close to the outer peripheral edge of the turntable as to the effective in its attraction to said turntable bottom wall 32 when energized as to resist any tendency the turntable might otherwise have to turn with rotation of spindles 42 in their bearings 44, under the driving engagement of drive wheel 64 on their sleeves 52. As shown in FIGURE 7, electro-magnet 100 is also connected in parallel with motor 54 as by lead 106 to line 82 and by lead 108 to line 80. Lead 106 includes a normally closed switch 110 which is mounted on wall 16 of the base adjacent lamp 92 and main switch 84 (FIGURE 2). Normally closed switch 110 is of the hold down type so that electro-magnet 100 is normally energized when the main switch 84 is closed and acts as a brake to resist turning of the turntable 22 on its axis 46. Whenever he finds need to shift his work from one tool to another, the operator merely grasps handle 96 of the turntable and while depressing switch 110 with his other hand to de-energize the electro-magnet 100, rotates the turntable to position the desired one of the other eighteen tools in front of his seated or standing position. Optionally, the operator in this action can also raise his foot off the control device 86 to slow down or stop the motor. As soon as the operator releases the pressure of his hand on switch 110, electro-magnet 100 is again energized and the selected tool is ready for use which the operator obtains by pressing his foot down on the speed control device 86 to reenergize the motor 54, and rotate the tool at the required speed.

Preferably, also, the interior of the turntable will be provided with a removable liner, which is indicated generally at 120 in FIGURE 3. Liner 120 serves to collect water or polishing agent used in the action of the tools on the contact lens or other work piece as well as to collect abradant material and other debris resulting from the grinding action. Liner 120 is constructed of a suitable inert plastic material such as polystyrene or methylmethacrylate and may be suitably colored or otherwise ornamented. As shown in FIGURE 3, liner 120 includes a base or bottom wall 122 and a peripherally located upstanding outer wall 126 which preferably extends to a height higher than the outwardly disposed side wall 36 of the turntable but not so high as to interfere with the operator's convenient access to or working with the spindle supported tools 38. The bottom wall 122 of liner 120 also includes appropriately located openings 125 (FIGURE 5) through which bearings 44 and spindles 42 may extend. About said openings are cylindrically shaped portions 128 which are integral with the liner bottom wall and extend to a height approximating the height of bearings 44 and the supporting caps 48 of the spindles. Usefully, a deflector 130 will be removably mounted over the conical end 46 of the spindle 42 so as to fit snugly therewith and be disposed below the tools 38. Said deflectors 130 may be formed of any suitably inert plastic or metallic material and will include a depending flange 132 of a dimension to surround the cylindrical portions 128 of the liner and effectively shield bearings 44 and spindle shafts 42 rotatably supported therein against penetration by water or other contaminants. It will be appreciated that liner 120 is readily removed for cleaning as by lifting tools 38 off the conical end 40 of the supporting spindles 42 and after removing deflectors 130.

The operation of the machine will thus be readily apparent from the description above, and it will be recognized that all the recited objects, features and advantages of the invention are derived in an entirely practical manner and by a machine or device which is simple to operate and of a construction practical to manufacture. It will, of course be understood that such a machine may be provided with any desired number of tool supporting spindles and that it will have many other uses than for supporting contact lens finishing tools.

It will also be understood that many other variations, as well as rearrangement of parts of the illustrated device or machine may be had within the spirit of the invention, and are intended to be included within the broad concept of the claimed invention, the described and illustrated device being merely for the purposes of exemplifying the invention.

Thus having described my invention, I claim:

1. In a multiple power-operated tool support, the combination of a base, a turntable mounted on said base to be turnable about a centrally disposed vertical axis, a plurality of tool supporting spindles rotatably mounted on said turntable to rotate on their respective longitudinal axes, said spindles being radially spaced about said centrally disposed vertical axis and with their longitudinal axes disposed parallel thereto, said spindles each including a lower portion protruding through the turntable, a motor mount pivotally supported on said base beneath the turntable to swing on an axis disposed parallel to said longitudinal axes of the spindles and the vertical axis about which the turntable is turnable, said mount supporting an electric motor and a horizontally disposed drive wheel rotatably driven by said motor, said drive wheel being located to engage the lower portion of an adjacent porting an electric motor and a horizontally disposed drive wheel rotatably driven by said motor, said drive wheel located to engage the lower portion of an adjacent pair of said spindles, said turntable being rotatable about its said vertical axis to selectively locate any adjacent two of said spindles in engagement with the drive wheel, and resilient means releasably holding said drive wheel into driving engagement with the lower portion of the two spindles so located to effect rotation thereof.

2. A multiple power-operated tool support as claimed in claim 1, having further means positioned on the base beneath the turntable to releasably hold the turntable against turning on its axis.

3. A multiple power-operated tool support as claimed in claim 2, wherein said further means include a normally energized electro magnet positioned so that its attractive force resists movement of the turntable, and means for temporarily deenergizing said electro-magnet to permit turning of the turntable on its vertical axis.

4. A multiple power-operated tool support as claimed in claim 1, having means for varying the speed of rotation of the motor and the drive wheel rotated thereby.

5. A multiple power-operated tool support as claimed in claim 1, wherein the turntable is provided with a peripherally disposed annular handle.

6. A multiple power-operated tool support as claimed in claim 1, further having a removable liner disposed on said turntable including an upwardly projecting cylinder about each said spindles, and wherein each said spindles carries a deflector overlying the open end of said cylindrical projections of the removable liner.

References Cited

UNITED STATES PATENTS

| 126,232 | 4/1872 | Piper | 77—25 |
|---|---|---|---|
| 504,289 | 8/1893 | Vanderbeck | 77—29 X |
| 2,976,737 | 3/1961 | Evans | 74—16 |
| 3,248,954 | 5/1966 | Blake | 74—16 |

FOREIGN PATENTS

| 122,963 | 2/1919 | Great Britain. | |

HAROLD D. WHITEHEAD, *Primary Examiner.*

UNITED STATES PATENT OFFICE
CERTIFICATE OF CORRECTION

Patent No. 3,380,201                                      April 30, 1968

Norman S. Patterson

It is certified that error appears in the above identified patent and that said Letters Patent are hereby corrected as shown below:

Column 6, lines 33 to 35, cancel "porting an electric motor and a horizontally disposed drive wheel rotatably driven by said motor, said drive wheel located to engage the lower portion of an adjacent".

Signed and sealed this 16th day of September 1969.

(SEAL)
Attest:

Edward M. Fletcher, Jr.                         WILLIAM E. SCHUYLER, JR.
Attesting Officer                                     Commissioner of Patents